Dec. 12, 1961  E. F. KELM  3,013,110
AERIAL CABLE HANGER
Filed July 9, 1959
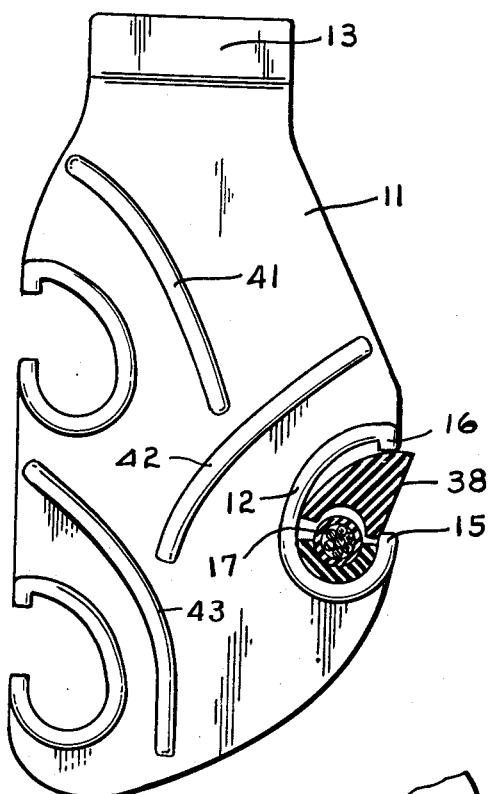
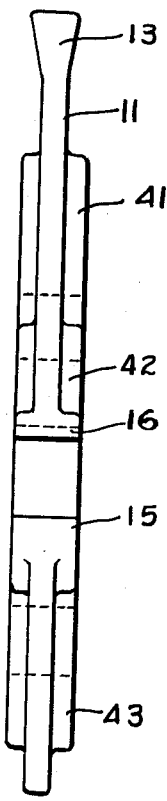
INVENTOR.
EVERETT F. KELM
BY Clarence R. Petty, Jr.
ATTORNEY

United States Patent Office 3,013,110
Patented Dec. 12, 1961

3,013,110
AERIAL CABLE HANGER
Everett F. Kelm, Corning, N.Y., assignor to Corning Glass Works, Corning, N.Y., a corporation of New York
Filed July 9, 1959, Ser. No. 825,965
5 Claims. (Cl. 174—146)

The present invention relates to aerial cable hangers adapted for use at spaced intervals between suitably spaced pole mounted cable supporting insulators to maintain the respective cables or conductors of a group thereof uniformly spaced from one another throughout the span between such insulators.

In conventional aerial cable constructions the cables are either supported in a parallel group or bundle and in suitably spaced rings or hangers suspended from a messenger, or they are wound or spun along and onto the messenger in a continuous helix.

The present invention is concerned with the provision of improved aerial cable hangers to be installed at regular intervals along the cable length intermediate the pole supported insulators.

According to the invention the hangers may be composed of metal or dielectric material, preferably the latter, and have formed integral therewith hooks with side entrances through which the cables or conductors may be passed and within their bordering space may be securely retained by resilient bushings, which, upon being introduced into such entrances and about the cables or conductors effectively lock the cables in place. Also according to the invention, a hanger may be provided with ribs for diverting rain, snow, or sleet away from the localized regions of the hanger at which the cables are anchored.

For a better understanding of the invention reference is now made to the accompanying sheet of drawing wherein:

FIG. 1 is a broadside elevational view of an aerial cable hanger embodying the invention and includes a sectional view of a cable and of a two-part bushing associated therewith.

FIG. 2 is an edgewise elevational view of the hanger.

FIGS. 3 and 4 are perspective views of the respective parts of a bushing for use with the hanger.

FIG. 5 is a view of a fragment of the hanger showing, in section, a cable locked therein by a bushing shown partly in section.

Referring to the drawing in detail, the hanger 11 is given a suitable pendant shape with the thickness necessary for the required strength, which depends upon the material from which it is formed, and has integrally formed therein three hooks, such as 12, suitably spaced from one another about its edges. The upper end of the hanger 11 is conveniently formed into an inverted wedge 13 by means of which it may be clamped and suspended from a messenger by suitable hardware.

Each of the hooks, such as 12, has a lower portion extending through an arc of approximately 180° from the lower border 15 of the entrance thereinto. The remaining portion of the hook extends through an arc of approximately 90° and of much larger radius than outlines its lower portion. Such arc terminates behind a projection 16 partly obstructing the hook entrance.

To firmly hold a cable, such as 17 for example, in a hook bordering space a bushing is provided. This bushing conveniently in part comprises one half of an axially divided spool embodying spool head parts such as 23 and 24 and a core part 25 with a flat surface 22 having cable receiving groove 26, and is adapted to occupy the lower portion of a hook bordering space, as illustrated in FIGS. 1 and 5. Such spool half has a core length such that the head parts 23 and 24 overlay the hook border-defining portion of the hanger. Properly positioned, as can be seen in the drawing, the spool half portion of the bushing terminates short of the top of border 15 and therefore in no way obstructs the entrance into the space bordered by the hook.

The remainder of the bushing part embodies a core part 35 approximately comprising a quarter section of a cylinder having the radius of the upper portion of a hook passage border. A flat surface 32 thereof matches surface 22 of core 25, and has a groove 36 therein companion to groove 26. The remaining flat surface 38 of core 35 is of a dimension to bridge the hook entrance passage and is compressible until it comes to rest locked behind the projection 16, and which brings the flat surface 38 tangential to the cylindrical surface of core 25. Such bushing part is also provided about its core portion 35 with head members 33 and 34 which overlay the space bordering portions of the border of the hook occupied by it.

The hanger 11, which is alike on its opposite broad sides, and is provided with ribs such as 41, 42, and 43 arranged over and about the respective hook regions thereof to aid in the diversion of rain, sleet or snow away from such regions.

What is claimed is:

1. An aerial cable hanger comprising a generally flat rigid unitary body of brittle dielectric material having a hook formed in an edge thereof, said hook having a lower portion that extends from a lower entrance border through an arc of approximately 180° and thence through an arc of greater radius through approximately 90° said hanger having a projection at the opposite border of the entrance to the hook against which the latter arc terminates.

2. An aerial cable hanger as in claim 1 wherein a split resilient bushing is provided for clamping a cable or conductor in the space bordered by said hook, said bushing comprising two parts jointly providing a passage for a cable or conductor, one of such parts comprising one half of an axially divided spool having a core whose arcuate portion matches that of the hook defined as extending 180° and the other part comprising substantially a quarter cylinder whose arcuate portion matches that of the hook defined as extending 90°, the remaining flat surface of such part being flat and of a dimension greater than the width of the hook entrance and insertable behind the border thereof adjacent the one bushing part and forceable into the opposite end of the entrance back of said projection.

3. An aerial cable hanger of brittle dielectric material having integrally formed therein a part for seizure and suspension of the hanger from a messenger and hook shaped side entrances for receipt of cables, one edge of each entrance border having a portion projecting into the hook entrance, split bushings for placement about cables to occupy the spaces bordered by said hooks, one part of each of said bushings fitting freely into a part of a hook bordered space while avoiding obstruction of the entrance thereto, the remaining part of the bushing having a flat surface one edge of which bridges opposite borders of a hook entrance and whose one edge is forceable behind such projecting portion to fully bridge a hook entrance.

4. An aerial cable clamp hanger as in claim 3 wherein the body of the hanger is provided with ribs arranged about the hooks thereof to divert rain and the like intercepted by the hanger away from regions occupied by the hooks thereof.

5. An aerial cable clamp comprising a hanger of brittle dielectric material having along a boundry edge thereof a part for its seizure and suspension from a messenger and in substantially uniformly spaced regions of its boundary having integrally formed hooks for receipt of power line conductors, each of said hooks having a border defining a space having a portion of one radius of curvature and an adjoining portion of a relatively large radius of curvature, the portion of the hanger forming the border portion of the hook of one radius of curvature terminating at one end of an entrance to such space, the other portion of the hook of relatively large radius of curvature at the opposite end of the hook entrance having a portion projecting into the opposite end of the entrance to such space, a resilient bushing divided into two parts having radii of curvature matching those of a hook space border and having a bore for receipt of a power line conductor, the bushing part with the larger radius of curvature having a flat side of a length sufficient to bridge the opposite borders of a hook cavity entrance and being of sufficient resiliency to be forceable to a position behind the one entrance border of a hook and behind such border portion projecting into its cavity entrance.

References Cited in the file of this patent

UNITED STATES PATENTS

| | | |
|---|---|---|
| 1,069,937 | Goehst | Aug. 12, 1913 |
| 1,725,119 | Williams | Aug. 20, 1929 |
| 2,451,699 | Twaroski | Oct. 19, 1948 |
| 2,787,435 | Shields | Apr. 2, 1957 |
| 2,839,597 | Hendrix | June 17, 1958 |
| 2,934,587 | Duffy | Apr. 26, 1960 |

FOREIGN PATENTS

| | | |
|---|---|---|
| 80,718 | Germany | Apr. 18, 1895 |